United States Patent [19]

Maclean

[11] 4,180,490

[45] Dec. 25, 1979

[54] ANTIBLOCK SYSTEM AND PROCESS AID FOR VULCANIZED VINYL ACETATE ETHYLENE COPOLYMERS

[75] Inventor: Robert D. Maclean, Wooster, Ohio

[73] Assignee: National Distillers and Chemical Corporation, New York, N.Y.

[21] Appl. No.: 931,715

[22] Filed: Aug. 7, 1978

Related U.S. Application Data

[63] Continuation-in-part of Ser. No. 835,762, Sep. 22, 1977, abandoned.

[51] Int. Cl.$^2$ ............................................. C08L 91/00
[52] U.S. Cl. ............................ 260/23 R; 260/23 AR; 260/23 H; 260/28.5 AV
[58] Field of Search .............. 260/23 R, 23 AR, 23 H, 260/28.5 A

[56] References Cited

U.S. PATENT DOCUMENTS

| | | | |
|---|---|---|---|
| 3,331,802 | 7/1967 | Huber et al. | 260/31.6 |
| 3,474,058 | 10/1969 | Ridgeway et al. | 260/23 |
| 3,541,041 | 11/1970 | Hermann et al. | 260/32.6 |
| 3,578,621 | 5/1971 | Stapfer | 260/31.6 |
| 3,691,219 | 9/1972 | Boussely | 260/410.7 |
| 3,775,147 | 11/1973 | Ferm | 260/28.5 AV |
| 3,891,587 | 6/1975 | Watts | 260/23 H |
| 4,012,547 | 3/1977 | Smedberg | 260/28.5 AV |

*Primary Examiner*—Melvyn I. Marquis
*Attorney, Agent, or Firm*—Kenneth D. Tremain

[57] ABSTRACT

Vulcanized vinyl acetate-ethylene elastomeric copolymers are substantially free of bloom and demonstrate improved anti-block and processing release characteristics upon the addition thereto of an effective amount of a mixture of stearic acid, paraffin wax and low molecular weight polyethylene.

8 Claims, No Drawings

ANTIBLOCK SYSTEM AND PROCESS AID FOR VULCANIZED VINYL ACETATE ETHYLENE COPOLYMERS

CROSS-REFERENCE TO RELATED APPLICATION

This application is a continuation-in-part of my copending U.S. patent application Ser. No. 835,762, filed, Sept. 22, 1977 now abandoned.

BACKGROUND OF THE INVENTION

1. Field of the Invention

This invention relates to the fields of anti-block agents and processing release agents for vulcanized vinyl acetate-ethylene elastomeric copolymers.

2. Description of the Prior Art

Vinyl acetate-ethylene (VAE) elastomeric copolymers are extremely self-sticking or cohesive in nature and, in fact, can be processed into excellent adhesives. Compounds of VAE also exhibit this extreme self-stickiness and, unless parting sheets such as polyethylene film are used to separate stacked pieces of the uncrosslinked compositions, the pieces will weld together to such a degree that they cannot be separated. Even after crosslinking, i.e., vulcanizing, molded articles of VAE will strongly cohere such that, for convenience, parting sheets must be used.

Several anti-block or slip agents are known for polyethylene, such as fatty acid amides, e.g., oleamide, stearamide, erucamide and behenamide. Ridgeway et al. (U.S. Pat. No. 3,474,058) describe the use of a metallic salt of a fatty acid in combination with a fatty acid amide for improved slip and anti-block properties in ethylene-vinyl acetate (EVA) copolymer films of low vinyl acetate (VA) content. In contrast, the high VA content VAE copolymers are elastomeric and will not form useful films. Fatty acid amides admixed with compounds of VAE impart no or limited anti-blocking capability. The addition of metal salts of fatty acids, with or without admixed fatty acid amides, has no effect on the anti-block characteristics of VAE compounds.

In addition to the pronounced self-sticking nature of VAE elastomeric copolymers, these resins when hot are extremely adhesive, especially to metallic surfaces. Consequently, VAE elastomeric copolymers are difficult to process due to the tendency of the hot elastomers to adhere to the surfaces of equipment with which they are in contact. For example, when compounded VAE resins are being blended in production scale apparatus such as a Banbury mixer, a considerable portion of a completed batch will not readily be dislodged from the machine but will adhere to the mixing rotors and mixing chamber surfaces where it is removed only with some difficulty and at a significant loss of production efficiency. As the size of the mixing equipment or other process apparatus is reduced, the difficulty of processing VAE elastomeric copolymers increases. In a laboratory scale Banbury mixer, all of the VAE resin will be retained in the mixing chamber and can only be removed by hand in a time consuming operation.

The addition of such compounding ingredients as fillers, plasticizers, antioxidants and curing agents has little or no effect on the adhesion of VAE resins to the surfaces of mixing and processing equipment other than to alter green strength (green strength being increased by reinforcing fillers and decreased by most other additives). Some improvements in release characteristics of VAE resins are observed with increasing green strength.

The lubrication or the plasticization of polymers which are chemically and physically dissimilar from VAE elastomeric copolymers are known. Ridgeway et al., supra, obtain improved slip in an EVA film by incorporating therein a combination of a metallic salt of a fatty acid and a fatty acid amide. EVA films are more nearly related to polyethylene films in their properties and behave in a manner which is altogether different from that of the VAE resins which as previously noted, cannot be formed into films.

Stapfer (U.S. Pat. No. 3,578,621) teaches the use of diesters as internal-external lubricants in structural resins such as polyvinyl chloride (PVC) and acrylonitrile-butadiene styrene (ABS) copolymer. Hermann et al. (U.S. Pat. No. 3,541,041) teach the use of hydroxy alkylated fatty amines as mold release agents for polyamides. Huber et al. (U.S. Pat. No. 3,331,802) describe the preparation of a plasticizer for PVC by an esterification of a mixture of mono and dibasic acids with a trihydric alcohol and a glycol component to give a polymeric ester composition of molecular weight 700 to 3000. Boussely (U.S. Pat. Nos. 3,691,219 and 3,864,295) describes the preparation of a synthetic glyceride which has lubricating properties and prevents sticking of, e.g., PVC compositions to processing equipment or molds at 210° C. (410° F.). Recent investigation has shown that glycerides are ineffective as release agents for VAE resins when used alone. McAninch et al. (U.S. Pat. No. 3,268,463) teach the use of a fatty acid ester of a polyhydric alcohol as a release agent in an asphaltic blend containing 1 to 30% EVA copolymer (from 27 to 34% VA content). After the hot liquid asphaltic blend has been applied to a metallic surface and allowed to harden on cooling, the release agent becomes effective. Commonly assigned copending patent application Ser. No. 783,527 of Meeks discloses and claims a VAE elastomeric copolymer of improved processing release characteristics imparted thereto by a mixture of hydrogenated glyceride and stearic acid. However, vulcanized VAE resins containing this mixture, while demonstrating good processing release characteristics, in some compounds and under certain storage conditions exhibit "bloom", a visible exudate on the surface of the product. It is also well known in the art that release for some polymers can be obtained from lubricants such as paraffin wax and stearic acid. However, neither is effective when used alone in VAE copolymers.

SUMMARY OF THE INVENTION

The present invention provides filled and unfilled compounds of vinyl acetate-ethylene elastomeric copolymers having improved anti-blocking and processing release characteristics in the crosslinked state by the addition thereto of an effective amount of an anti-block, processing release system comprising stearic acid, paraffin wax and low molecular weight polyethylene. The unique feature of this three component system is that it provides: (1) release from metal surfaces of processing equipment such as Banbury internal mixer, mills, extruders, etc. over a broad temperature range, (2) freedom from adhesion to itself or other materials for sheets or other product forms during storage both before and after the compound is crosslinked, and (3) non "blooming", crosslinked vinyl acetate ethylene copolymers. "Blooming" is a migration of additives to the exterior surface of a material as a visible non-desirable coating, usually white or a different color than that of the compound. The non-crosslinked products are readily removed from the walls and surface of conventional processing equipment and will no longer cohere to other materials or block when stacked or place together. This invention is carried out by admixing the antiblocking, processing release system with the vinyl acetate-ethylene copolymers in conventional rubber or plastic mixing equipment prior to the addition thereto of crosslinking agents, and optionally, addition of other materials such as fillers, antioxidants and the like.

Throughout the specification and claims, all parts of VAE copolymer components refer to parts by weight.

DESCRIPTION OF THE PREFERRED EMBODIMENTS

While the anti-blocking and processing release properties of virtually all of the known and conventional vinyl acetate-ethylene copolymer vulcanizates can be significantly improved in accordance with the present invention, it is preferred herein to use the VYNATHENE series of VAE copolymers obtained from U.S. Industrial Chemicals Co., Division of National Distillers and Chemical Corporation. These VAE elastomers range from about 40 to about 60% by weight of vinyl acetate. The typical physical properties of VYNATHENE VAE elastomers (raw gum stock) are set forth in Table I as follows:

TABLE I

TYPICAL PROPERTIES OF VYNATHENE VAE COPOLYMERS

| VYNATHENE | EY 903 | EY 904 | EY 906 | EY 907 |
|---|---|---|---|---|
| Vinyl acetate content | 45% | 52% | 55% | 60% |
| Density | 0.948 | 0.986 | 1.00 | 1.02 |
| Mooney Viscosity (ml 1 + 4 at 100° C.) | 20 | 20 | 20 | 20 |
| Color | Water White | Water White | Water White | Water White |
| Form | Pellets | Pellets | Slabs | Slabs |
| Volatiles | Less than 0.3% | Less than 0.3% | Less than 0.3% | Less than 0.3% |

To provide VAE elastomeric copolymers with improved anti-block and process release characteristics, the mixture of stearic acid, paraffin wax and low molecular weight polyethylene constituting the anti-blocking, processing release system, or each individual component of the same, is admixed with the copolymers in conventional mixing equipment, typified by a two roll rubber mill, a mixing extruder, or preferably, a high shear internal mixer such as a Banbury mixer, such that a mixture is produced in which the aforesaid system is substantially uniformly distributed therein. Other compounding ingredients such as fillers, antioxidants, crosslinking agents, or other known and conventional elastomer additives can be included in the formulation depending on the desired properties of the end product. The anti-blocking and processing release system can be added prior to the vulcanization of the VAE copolymer and it is preferred to combine the system with the copolymer before adding the other ingredients in the mixing operation.

The invention contemplates the use of any of the commercially available grades of stearic acid. It is preferred however, to employ a relatively pure grade, i.e., one containing at least 92% stearic acid, the remainder being palmitic acid. Hystrene 9718 (Humko Division, National Dairy Products Corporation) which is a triple pressed stearic acid containing 95% stearic and 5% palmitic acids has been found to provide good results. The stearic acid is contained in the anti-blocking, processing release system at a level of from about 0.5 to about 1.5 parts per hundred (phr) of VAE copolymer. Quantities significantly in excess of this level are generally to be avoided as the VAE vulcanizates will only bloom badly giving a foggy surface with a waxy feel. In practice, 1.0 phr stearic acid has been found to provide excellent results. The term "paraffin wax" as used herein refers to any of the grades of solid hydrocarbon waxes of high molecular weight generally represented by the formula $CnH_{2n+2}$ (n=30 to 40) which are derived from petroleum. White scale grade paraffin wax is preferred for use herein since it minimizes any opportunity for discoloration of the VAE resin. Paraffin wax is advantageously present in the anti-blocking, processing release system at a level of from about 1.0 to about 3.0 phr of VAE copolymer. A paraffin wax level of 2.0 phr has been found to provide excellent results. The third component of the anti-blocking, processing release system herein, low molecular weight polyethylene, contemplates the use of any of the known and conventional resins of this type, namely, those polyethylenes having an average molecular weight of about 1500 to about 4000 and preferably a molecular weight of about 1500 to about 2500, e.g., A-C Polyethylene grades 617, 617 A, 6, 6A and 7 (Allied Chemical Co.) and Epolene Wax grades N-14, N-11, N-12 and N-45 (Eastman Chemical Products, Inc.) Low molecular weight polyethylene resin is advantageously incorporated into the system at a level of from about 1.0 to about 3.0 phr of VAE copolymer with 2.0 phr being preferred.

Any of several known and conventional anti-oxidants can be incorporated into the copolymers herein. Agerite D and Agerite MA (R. T. Vanderbilt Company, Inc.), polymerized trimethyl dihydroquinoline antioxidants have been used with good results.

Among the fillers which can advantageously be employed herein include: Hydral 710, an alumina trihydrate obtained from Alcoa; Hi-Sil EP and Hi-Sil 233, amorphous precipitated hydrated silicas obtained from PPG Industries, Inc.; Cab-O-Sil, a fumed silica obtained from Cabot Corporation; Sterling SO, and FEF carbon black (ASTM N-550) obtained from Cabot Corporation; Mistron Monomix, a talc (magnesium silicate) from Cyprus Industrial Minerals Company; Burgess KE, a surface treated (silane) calcined kaolin clay (anhydrous aluminum silicate) obtained from the Burgess Pigment Company; Celite 292, a diatomaceous earth from John-Manville Products Corporation, Celite Division; and, antimony oxide obtained from the Harshaw Chemical Company. Many other fillers can be used in the VAE copolymers of this invention as is recognized by those skilled in the art.

Curing agents which can be used herein include such peroxides as: t-butyl perbenzoate, dicumyl peroxide, 2,5-dimethyl-2,5-di(t-butyl peroxy) hexane, 2,5-dimethyl-2,5-di(t-butyl peroxy) hexyne-3, 1,3,5-tris [a,a-dimethyl-a-(t-butyl peroxy)]-methyl benzene, a,a-bis (t-butyl peroxy) diisopropyl benzene and n-butyl-4,4-bis(t-butyl peroxy) valerate. These curing agents can be used alone or in combination with any of several polyfunctional monomers such as triallyl cyanurate, triallyl isocyanurate triallyl phosphate, trimethylol propane triacrylate, diallyl fumarate, pentaerythritol tetraacrylate, trimethylol propane trimethacrylate, 1,3-butylene glycol dimethacrylate, allyl methacrylate, ethylene glycol dimethacrylate and 1,3-butylene glycol diacrylate. The preferred curing agents for use herein include Vul-Cup 40 KE alone (40% a,a'bis(t-butyl peroxy) diisopropyl benzene or Burgess KE obtained from Hercules Inc.) and Vul-Cup 40 KE in combination with the polyfunctional monomer triallyl isocyanurate (TAIC) obtained from Mitsubishi International Corp., Chemicals Dept.

The amount of antioxidant used is advantageously from about 0.1 to about 4.0 parts, and preferably about 2.0 to about 3.0 phr of VAE copolymer.

The amounts of filler incorporated into the VAE copolymer will depend on the nature of the filler and the properties desired of the end product. Non-reinforcing fillers such as alumina trihydrate can be used in amounts ranging from about 5.0 parts to about 400.0 parts, and preferably from about 100 to about 150 phr of VAE copolymer. Reinforcing fillers such as hydrated silica, carbon black and sintered colloidal silica are useful in the range of from about 5.0 parts to about 100.0 phr of VAE copolymer but the useful upper range is limited by the high viscosity imparted by fillers of this type. The preferred amounts of these reinforcing fillers range from about 20.0 to about 80 phr for hydrated silica and carbon black and from about 10.0 to about 50.0 phr of copolymer for sintered colloidal silica.

The amount of peroxide curing agent can range from about 1.0 to about 10 phr, and preferably from about 2.0 to about 5.0 phr of VAE copolymer. The most preferred range of curing agents is from about 3.0 to about 4.0 phr.

The polyfunctional monomer used as auxiliary curing agent in combination with crosslinking peroxide can be used in the range of from about 0.1 to about 3.0 phr of VAE copolymer. The preferred amount of auxiliary curing agent can range from about 0.5 to about 1.5 phr and the most preferred amount about 1.0 phr.

In an experiment, the results of which are set forth in Table II, the release properties of an anti-blocking, processing release system in accordance with this invention (System B) is compared with the system of the aforementioned Meeks application (System A).

TABLE II

Comparison of Anti-Blocking, Processing Release Systems

| Ingredient | PARTS | |
|---|---|---|
| | System A | System B |
| Base Formula[1] | 157 | 157 |
| Neustrene 060[2] | 2 | |
| Stearic Acid | 2 | 1 |
| Paraffin Wax | | 2 |
| Low molecular weight polyethylene | | 2 |
| Vulcanizate Bloom | Yes | No |
| Banbury Mixer Release | Fair to Poor | Excellent |
| Mill Release | Fair | Excellent |

[1]VYNATHENE EY 904, 100 phr; Agerite Resin D, 3phr; FEF Black, 50 phr; Vul Cup 40 KE, 3phr; TAIC, 1 phr
[2]Mixture of refined hydrogenated tallow glycerides having a saturated carbon chain composition averaging about 67% stearic, 29% palmitic and 4% myristic combined acids.

What is claimed is:

1. A vinylacetate-ethylene elastomeric copolymer vulcanizate containing an anti-blocking and processing release effective amount of an anti-blocking, processing release system comprising stearic acid, paraffin wax and a polyethylene having an average molecular weight of from about 1500 to about 4000, said processing release system being substantially uniformly distributed in said vulcanizate.

2. The vinyl acetate-ethylene elastomeric copolymer vulcanizate of claim 1 containing from about 40 to about 60% vinyl acetate by weight.

3. The vinyl acetate-ethylene elastomeric copolymer vulcanizate of claim 1 containing from about 0.5 to about 1.5 phr stearic acid, about 1.0 to about 3.0 phr paraffin wax and about 1.0 to about 3.0 phr polyethylene by weight of said vulcanizate.

4. The vinyl acetate-ethylene elastomeric copolymer vulcanizate of claim 3 containing about 1.0 phr stearic acid, 2.0 phr paraffin wax and about 2.0 phr polyethylene by weight of said vulcanizate.

5. A method for improving the anti-blocking and processing release characteristics of a vinyl acetate-ethylene elastomeric copolymer vulcanizate which comprises substantially uniformly distributing in said vulcanizate an anti-blocking and processing release effective amount of an anti-blocking and processing release system comprising stearic acid, paraffin wax and a polyethylene having an average molecular weight of from about 1500 to about 4000.

6. The method of claim 5 wherein there is substantially uniformly distributed in the vinyl acetate-ethylene elastomeric copolymer vulcanizate, from about 40 to about 60% vinyl acetate by weight.

7. The method of claim 5 wherein there is substantially uniformly distributed in the vinyl acetate-ethylene elastomeric copolymer vulcanizate, from about 0.5 to about 1.5 phr stearic acid, about 1.0 to about 3.0 phr paraffin wax and about 1.0 to about 3.0 phr polyethylene by weight of said vulcanizate.

8. The method of claim 7 wherein there is substantially uniformly distributed in the vinyl acetate-ethylene elastomeric copolymer vulcanizate, about 1.0 phr stearic acid, 2.0 phr paraffin wax and about 2.0 phr polyethylene by weight of said vulcanizate.

* * * * *